W. M. SAUNDERS.
Hay-Tedder.

No. 207,074. Patented Aug. 13, 1878.

Witnesses:
W. Carleton Mc Arthur
John L. Coudron

Inventor:
Wm. M. Saunders
J. H. Alexander & Elliott,
Attorneys.

UNITED STATES PATENT OFFICE.

WILLIAM M. SAUNDERS, OF ALFRED CENTRE, NEW YORK.

IMPROVEMENT IN HAY-TEDDERS.

Specification forming part of Letters Patent No. 207,074, dated August 13, 1878; application filed May 8, 1877.

*To all whom it may concern:*

Be it known that I, WM. M. SAUNDERS, of Alfred Centre, in the county of Allegany and State of New York, have invented certain new and useful Improvements in Hay-Tedders; and I do hereby declare that the following is a full, clear, and exact description thereof, reference being had to the accompanying drawings, and to the letters of reference marked thereon, which form part of this specification.

The nature of my invention consists in the construction and arrangement of a hay-tedder, as will be hereinafter more fully set forth.

In order to enable others skilled in the art to which my invention appertains to make and use the same, I will now proceed to describe its construction and operation, refering to the annexed drawings, in which—

Figure 1:
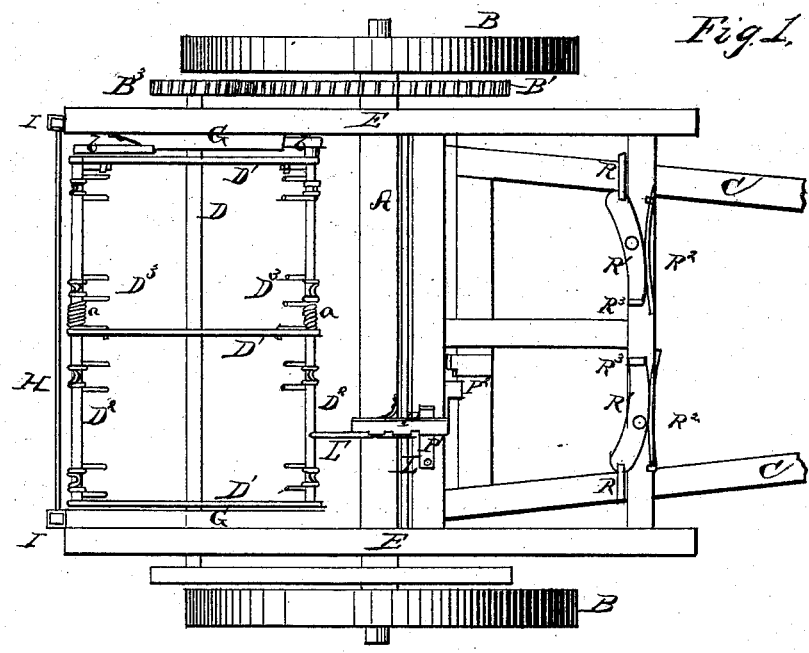
Figure 2:
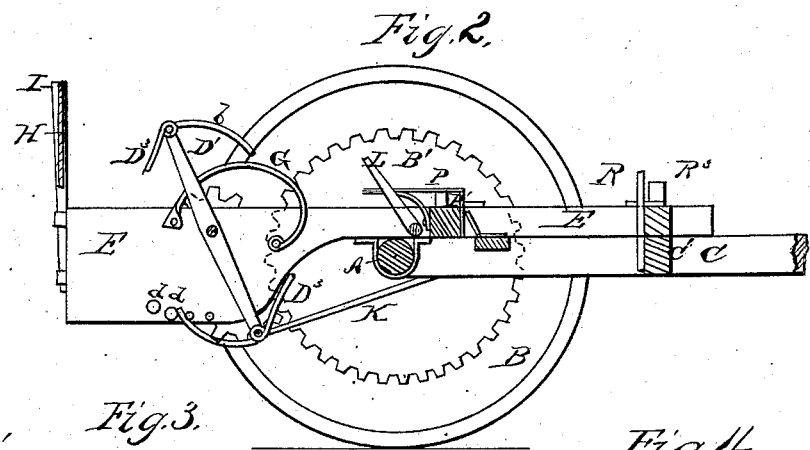
Figure 3:
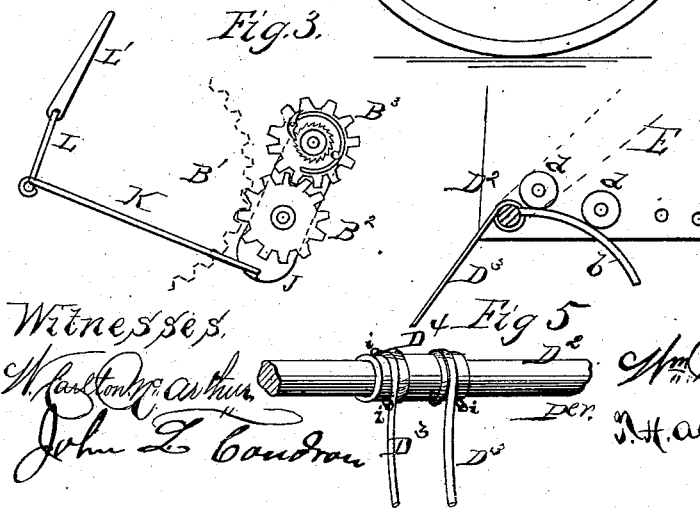
Figure 4:
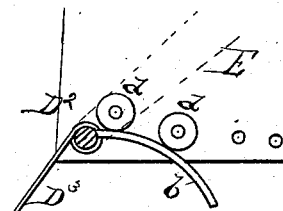
Figure 5:
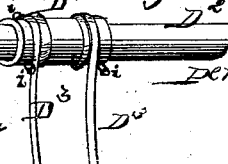

Figure 1 is a plan view, Fig. 2 a central longitudinal section, and Figs. 3, 4, and 5 are details, of my invention.

A represents the axle, to which the shafts C C are firmly secured, and upon the ends of which the driving-wheels B B are placed. On the inner side of each driving-wheel B is secured a cog-wheel, $B^1$, which, by means of an intermediate idle-pinion, $B^2$, imparts motion to a pinion, $B^3$, secured on the end of a reel-shaft, D, having its bearings in the rear ends of a frame, E, which is hinged on top of the axle A.

$D^1$ $D^1$ are the reel-arms, secured to the shaft D, and in the ends of said arms are placed the tine-shafts $D^2$ $D^2$, two or more, as desired. Each shaft $D^2$ is provided with a series of wire forks or tines, $D^3$, and is also provided with a spiral spring, $a$, one end of which is fast to the shaft and the other end to one of the arms $D^1$.

On one end of each tine-shaft is secured a curved lever, $b$, which strikes, during the revolution of the reel, two rollers, $d$ $d$, mounted on studs on the inner side of the frame E. These rollers or their equivalents are to be made adjustable in the frame by providing the frame with several holes for their studs or bolts to be fastened in, so as to change their position for the purpose of increasing or lessening the motion of the tines for throwing the hay higher or lower, as may be desired.

The levers $b$ are made of spring-steel, and so constructed that when they come near the hay they slide up on the rollers $d$, or their equivalents, which reverses the levers and throws the forks or tines $D^3$ in the right position to catch the hay, throwing it back and up sufficient to stir it thoroughly. The rollers $d$, or other device used for the same purpose, are placed below and in rear of the reel-axle D, and by moving them forward it lessens the height the hay is raised, while by moving them backward said height is increased.

The spring or springs $a$ on each shaft $D^2$ are so arranged as to instantly drop the tines by revolving the tine-shaft back as soon as the arm or lever $b$ passes off the roller $d$, thus preventing the possibility of any hay being carried over the reel.

G represents a cam, placed at a proper distance over the tine-shafts for the purpose of assisting the springs in holding the tines tilted while passing over the reel; or said cam may be placed under the tine-shafts and over the reel-axle at either end of the reel, and in connection therewith use only one set of tine-shaft levers $b$, or one lever on each end of the tine-shaft, as may be desired, according to the position of the cam.

At or near the rear end of each side piece of the frame E is fastened a stake, I, and these two stakes are connected by a cloth, H, extending across, over, and slightly back of the reel, for the purpose of preventing the hay from being carried over the reel when the wind blows hard. This device can be put on and taken off in an instant, and is not intended to be used except in very windy weather.

The tine-shafts $D^2$ may be made of solid iron rods, with or without sections of gas-pipe to fit and slip over it, and for the coils attached to the tines to slip over and bolt through both sections and rods, each section being of a length sufficient for two tines with the coils attached; or it may be made of gas-pipe alone.

The idle-pinions $B^2$ on the sides of the main frame E are mounted in studs on pivoted plates J, and these plates are, by rods K, connected with a crank-shaft, L, provided with a lever, $L'$, for the purpose of throwing said pinions $B^2$ in and out of gear with the cog-wheels $B^1$, and thus start and stop the revolution of the reel, as desired.

The lever $L'$ is held in either position by means of a pivoted rack, P, actuated by a spring, P¹, and provided with a foot-piece, P², for turning it away from the lever when the same is to be moved.

On the cross-piece C', between the thills or shafts C C, are two upright rack-bars, R R, into which take two levers, R¹ R¹, pivoted on the front cross-bar of the frame E, for holding said frame to the thills. These levers are held in the racks by springs R² R², and they are provided with foot-pieces R³ R³, extending up sufficiently far for the foot to press against when desired to raise or lower the tines. This is, however, seldom necessary to do, as the tines or forks lie tilted within the circle of the tine-shafts.

In Fig. 5 I have shown the tine-shaft D² provided with tubular sections D⁴, to increase the size for the coils of the tines D³ to coil over. These are bolted by bolts $i$ directly through the eye of the tine, the section, and the tine-shaft, one bolt to each tine.

Having thus fully described my invention, what I claim as new, and desire to secure by Letters Patent, is—

1. The combination of the reel D D¹, tine-shafts D², with spiral springs $a$, and curved levers $b$, the adjustable rollers $d$, placed in rear of and below the reel-axle, and the stationary cams G, all constructed and arranged to operate substantially as and for the purposes herein set forth.

2. In a hay-tedder, an apron, H, arranged above and in rear of the reel, for the purposes herein set forth.

3. The combination, with the idle-pinions B², pivoted plates J, and rods K, of the crank-shaft L, with lever L', pivoted rack P, with foot-piece P², and the spring P¹, substantially as and for the purposes herein set forth.

In testimony that I claim the foregoing as my own I affix my signature in presence of two witnesses.

WILLIAM M. SAUNDERS.

Witnesses:
 JAMES R. CRANDALL,
 M. A. CRANDALL.